(12) United States Patent
Choo et al.

(10) Patent No.: US 10,178,294 B2
(45) Date of Patent: *Jan. 8, 2019

(54) CONTROLLING A VIDEO CAPTURE DEVICE BASED ON COGNITIVE PERSONAL ACTION AND IMAGE IDENTIFICATION

(71) Applicant: International Business Machines Corporation, Armonk, NY (US)

(72) Inventors: Kristina Y. Choo, Chicago, IL (US); Rashida A. Hodge, Ossining, NY (US); Krishnan K. Ramachandran, Campbell, CA (US); Gandhi Sivakumar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,263

(22) Filed: May 25, 2017

(65) Prior Publication Data

US 2018/0343376 A1 Nov. 29, 2018

(51) Int. Cl.
*H04N 5/232* (2006.01)

(52) U.S. Cl.
CPC ..... *H04N 5/23203* (2013.01); *H04N 5/23219* (2013.01)

(58) Field of Classification Search
None
See application file for complete search history.

(56) References Cited

U.S. PATENT DOCUMENTS

| 7,957,837 B2 | 6/2011 | Ziegler et al. |
| 2010/0076600 A1 | 3/2010 | Cross et al. |

(Continued)

FOREIGN PATENT DOCUMENTS

| JP | 2002261966 A | 9/2002 |
| JP | 2002331482 A | 11/2002 |
| JP | 2003291084 A | 10/2003 |

OTHER PUBLICATIONS

Rancisco Erivaldo Fernandes, Jr. et al., "Detection of Privacy-sensitive Situations for Social Robots in Smart Homes", 2016 IEEE International Conference on Automation Science and Engineering (CASE), Fort Worth, TX, USA, dated Aug. 21-24, 2016, pp. 727-732.

(Continued)

*Primary Examiner* — Paul M Berardesca
(74) *Attorney, Agent, or Firm* — Nicholas D. Bowman; Hunter E. Webb; Keohane & D'Alessandro PLLC

(57) ABSTRACT

Aspects of the present invention provide an approach for controlling an operation of a video capture device (e.g., in a cognitive robotic device). In an embodiment, a set of conditions is obtained using a cognitive computer system. Each of the obtained conditions includes a specific individual and a potential action that may be performed by the individual. The cognitive computer system analyzes video being captured by the video capture device to determine whether the video satisfies any of the set of conditions (e.g., the individual in the video is performing the action). If the cognitive computer system determines that one of the set of conditions has been satisfied, the operation of the video capture device (e.g., capture rate of the video) is modified to account for the satisfied condition.

4 Claims, 5 Drawing Sheets

(56) References Cited

U.S. PATENT DOCUMENTS

| | | |
|---|---|---|
| 2011/0063440 A1* | 3/2011 | Neustaedter .......... H04N 5/144 348/143 |
| 2011/0134275 A1 | 6/2011 | Nguyen |
| 2013/0282446 A1 | 10/2013 | Dobell |
| 2016/0335802 A1 | 11/2016 | Bradski |

OTHER PUBLICATIONS

Robert Templeman et al., "PlaceAvoider: Steering First-Person Cameras away from Sensitive Spaces", NDSS 2014, 15 pages.
Deok-Seok Seo et al., "Privacy protection in human-centric healthcare home environment", Nov. 29, 2012, 3 pages.
Itaru Kitahara, "Stealth Vision for Protecting Privacy", Proceedings of the 17th International Conference on Pattern Recognition (ICPR'04), vol. 4, IEEE, 2004, 4 pages.
Berardesca, Paul M., U.S. Appl. No. 15/836,997, Office Action dated Sep. 17, 2018, 25 pages.

\* cited by examiner

CONTROLLING A VIDEO CAPTURE DEVICE BASED ON COGNITIVE PERSONAL ACTION AND IMAGE IDENTIFICATION

TECHNICAL FIELD

The subject matter of this invention relates generally to video capture. More specifically, aspects of the present invention provide a solution that uses a cognitive system to modify the capture of video in response to real-world situations.

BACKGROUND

In the information technology (IT) environment of today, an increasing number of (cognitive era) services are delivered through tangible capabilities. For example, functions performed by current generation robots or intangible capabilities of other (e.g., internet of things) devices can be enabled through cognitive attributes. As such, the cognitive entities that can help humans in personal day-to-day life are increasingly located in the same living environment as humans.

One type of device that is increasingly entering the home is a cognitive robotic (CR) device. These CR devices can use sensory inputs to "learn" behaviors over time. To do so, CR devices may include video capture devices that capture visual information, which may be streaming or static. This visual information may be processed in real time and/or may be cached or otherwise stored for later processing.

SUMMARY

In general, aspects of the present invention provide an approach for controlling an operation of a video capture device (e.g., in a cognitive robotic device). In an embodiment, a set of conditions is obtained using a cognitive computer system. Each of the obtained conditions includes a specific individual and a potential action that may be performed by the individual. The cognitive computer system analyzes video being captured by the video capture device to determine whether the video satisfies any of the set of conditions (e.g., the individual in the video is performing the action). If the cognitive computer system determines that one of the set of conditions has been satisfied, the operation of the video capture device (e.g., capture rate of the video) is modified to account for the satisfied condition.

One aspect of the invention provides a method for controlling an operation of a video capture device, comprising: obtaining, using a cognitive computer system, a set of conditions, each of the set of conditions corresponding to an individual and an action performed by the individual; determining, using the cognitive computer system, whether video currently being captured by the video capture device satisfies the set of conditions; and modifying an operation of the video capture device in response to a determination that the video currently being captured by the video capture device satisfies the set of conditions.

Another aspect of the invention provides a system for controlling an operation of a video capture device, comprising: a memory medium comprising instructions; a bus coupled to the memory medium; and a processor coupled to the bus that when executing the instructions causes the system to perform a method, comprising: obtaining, using a cognitive computer system, a set of conditions, each of the set of conditions corresponding to an individual and an action performed by the individual; determining, using the cognitive computer system, whether video currently being captured by the video capture device satisfies the set of conditions; and modifying an operation of the video capture device in response to a determination that the video currently being captured by the video capture device satisfies the set of conditions.

Yet another aspect of the invention provides a computer program product embodied in a computer readable medium that, when executed by a computer device, performs a method for controlling an operation of a video capture device, the method comprising: obtaining, using a cognitive computer system, a set of conditions, each of the set of conditions corresponding to an individual and an action performed by the individual; determining, using the cognitive computer system, whether video currently being captured by the video capture device satisfies the set of conditions; and modifying an operation of the video capture device in response to a determination that the video currently being captured by the video capture device satisfies the set of conditions.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
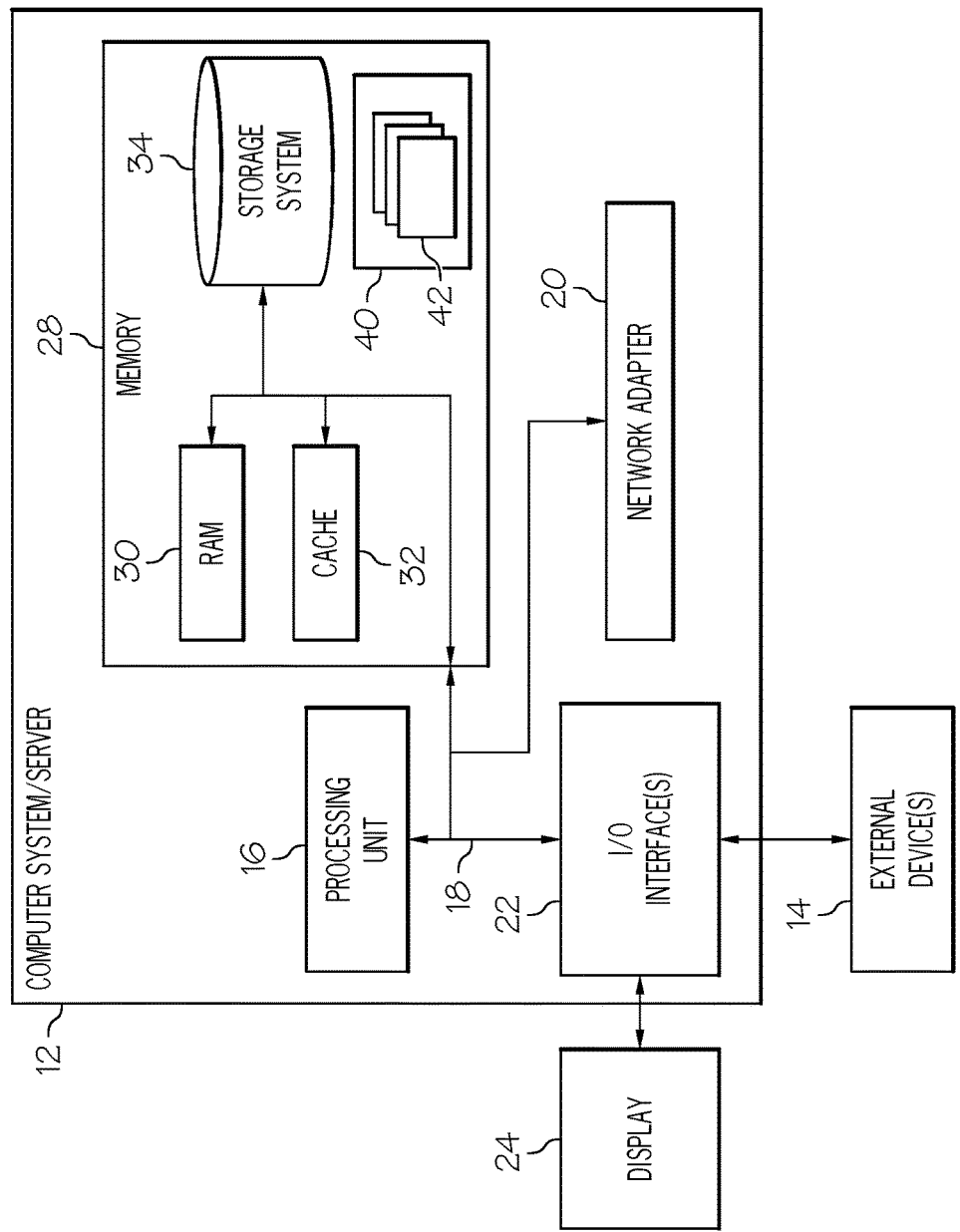
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for controlling an operation of a video capture device (e.g., in a cognitive robotic device). In an embodiment, a set of conditions is obtained using a cognitive computer system. Each of the obtained conditions includes a specific individual and a potential action that may be performed by the individual. The cognitive computer system analyzes video being captured by the video capture device to determine whether the video satisfies any of the set of conditions (e.g., the individual in the video is performing the action). If the cognitive computer system determines that one of the set of conditions has been satisfied, the operation of the video capture device (e.g., capture rate of the video) is modified to account for the satisfied condition.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
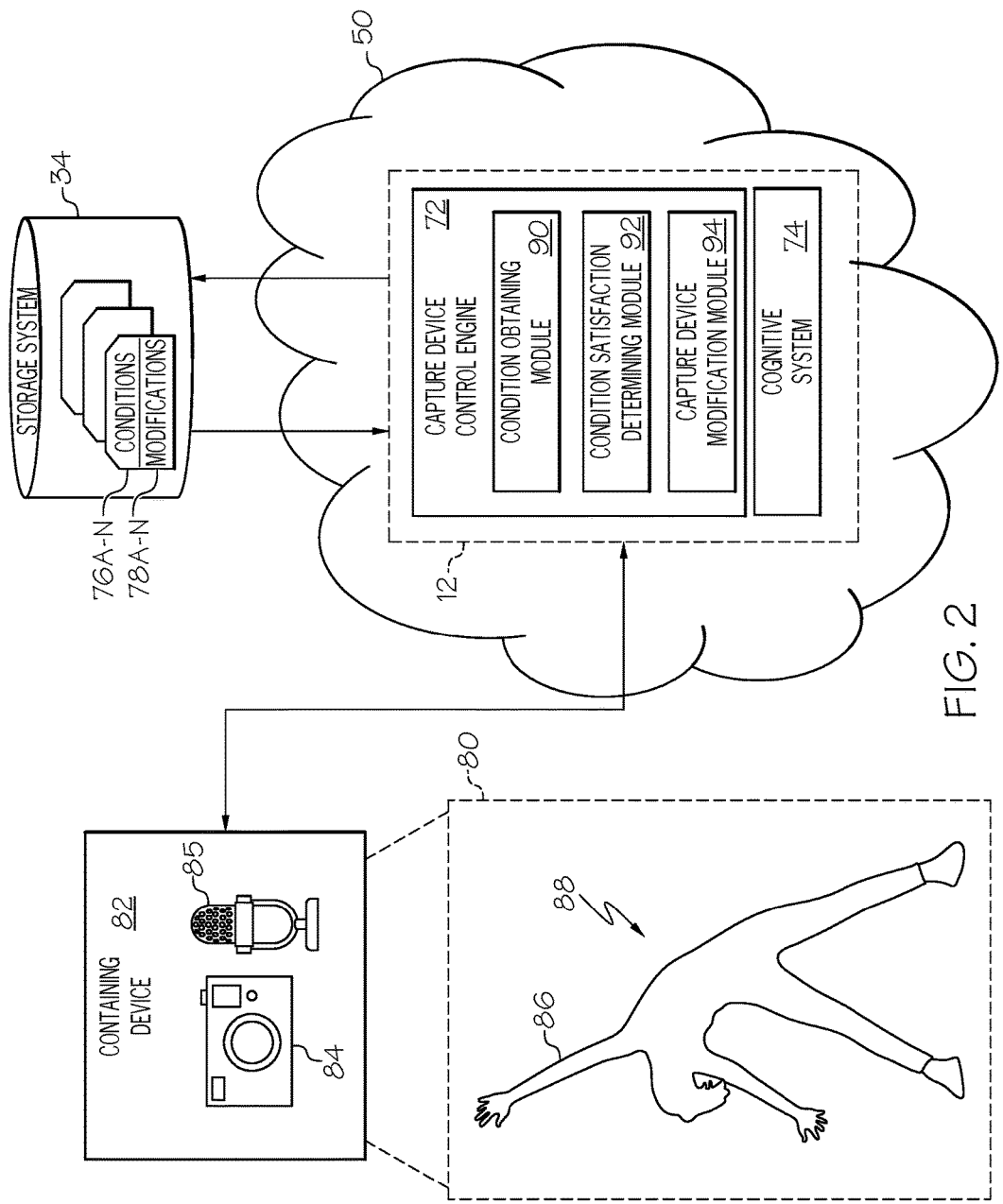
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each video capture device 84 or containing device 82 within which video capture device 84 is included need not have a capture device control engine (hereinafter "system 72"). Rather, system 72 could be loaded on a server or server-capable device that communicates (e.g., wirelessly) with video capture device 84 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to video capture devices 84 (e.g., in a cognitive and/or network computing environment). Such other system(s) have not been shown in FIG. 2 for brevity purposes.

Along these lines, system 72 may perform multiple functions similar to a general-purpose computer. Specifically, among other functions, system 72 can control an operation of video capture device 84. To accomplish this, system 72 can include: a condition obtaining module 90, a condition satisfaction determining module 92, and a capture device modification module 94.

Referring again to FIG. 2, video capture device 84 is shown capturing a video image 80 according to an embodiment of the invention. Video image 80 may be a sequence of still images (e.g., with each taken a predetermined amount of time after the previous image) or, alternatively, video image 80 may be a streaming image. To this extent, video capture device 84 can be a camera, a video camera, or any other device capable of capturing analog images, digital images, and/or the like. Further, in some embodiments, video capture device 84 can be encompassed within containing device 82 while in others, video capture device 84 can be a stand-alone device. In embodiments in which video capture device 84 is encompassed with containing device 82, containing device 82 can include, but is not limited to, a cognitive robotic (CR) device, such as a robot or robotic device; a security system; an internet of things device; a video game system; a computer system; a smart device; and/or the like. In any case, while performing its function, video capture device 84 may capture a video image 80 that contains an individual 86 and an action 88 that is currently being performed by individual 86.

The inventors of the invention described herein have discovered certain deficiencies in the current solutions for controlling a video capture device 84. For example, in many cases, video capture devices 84 are required to monitor the environment in order to provide security, to determine whether a containing device 82 associated with the video capture device 84 should wake up, etc. Because of this always-on operation, a particular video capture device 84 may capture a video image 80 of an individual 86 performing an action 88 that the individual does not wish to be recorded. To solve this problem, the user may decide to power off the video capture device 84, and potentially the containing device 82 in which the video capture device 84 resides, if any. Alternatively, the user may choose to obstruct the view of the video capture device while action 88 is being performed. However, these solutions require the user to remember to re-start the video device or remove the obstruction manually, and failure to do so could result in the user not being able to take advantage of the functionality of the video capture device 84, and associated containing device, if any, when needed. One other possible solution may involve disabling the video capture device 84 during a particular scheduled time period. However, this solution requires the user to perform the action 88 during the specified time period or be recorded anyway. Further, the solution always disables the video capture device 84 during the specified time period whether or not the action 88 is currently being performed, potentially causing the user not to have the video capture device 84 available when needed.

Referring again to FIG. 2, condition obtaining module 90 of system 72, as executed by computer system/server 12, is configured to obtain a set of conditions 76A-N that may necessitate the modification of video capture device 84. In an embodiment, these conditions 76A-N can be provided to a cognitive system 74 initially by individual 86 that may be the subject of captured image 86, by another user of the video capture device 84, by someone who has oversight responsibility over the location in which the video capture device 84 is located, or by any other appropriate user. Subsequently, conditions 76A-N can be retrieved by an interaction between video capture device 84 and/or containing device 82 with a cognitive system 74 (e.g., in response to an event such as a startup of video capture device 84 or containing device 82, a change of an individual 86 or action 88 within video image 80, or the like). To this extent, cognitive system 74 is a computer system that is configured to provide information and/or determine actions based on provided information and external contextual data. Cognitive system 74 has self-learning attributes that increase the accuracy of the determinations as more information and/or contextual data is provided. In an embodiment, cognitive system 74 can include IBM's Watson Analytics or Watson Personality Insights (Watson and IBM are trademarks of International Business Machines Corporation). In any case, each condition 76N in the set of conditions 76A-N contains one or more individuals 86 that may be captured in video image 80 and one or more actions 88 that the individual(s) 86 does not wish to be recorded performing.

Figure 3:
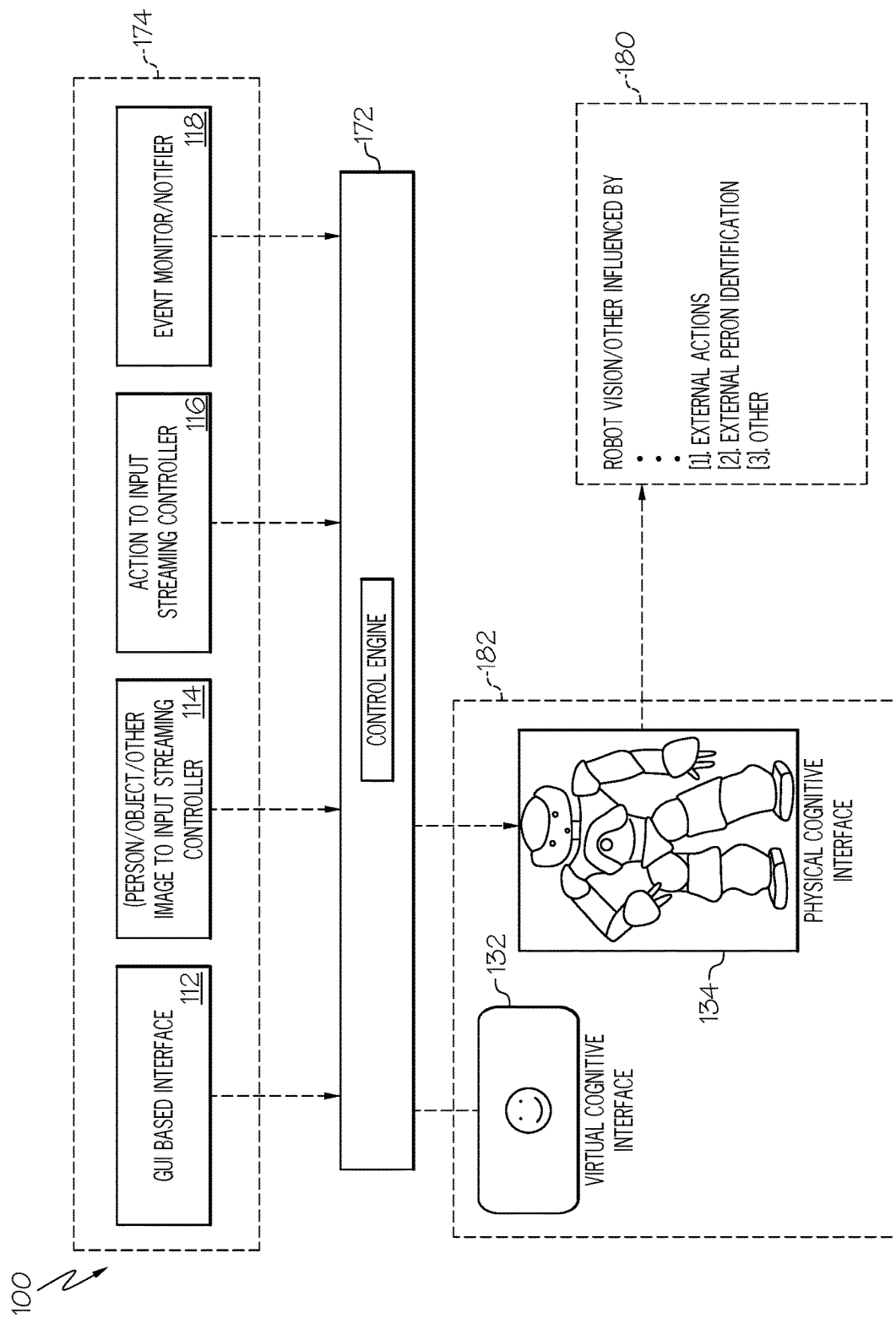
FIG. 3 depicts an example component diagram according to an embodiment of the present invention.

Referring now to FIG. 3, an example component diagram 100 is depicted according to an embodiment of the current invention. As shown, component diagram 100 includes a control engine 172, a cognitive system 174, and a containing device 182 that includes a video capture device (not shown). As illustrated, cognitive system 174 includes a GUI based interface 112. Referring additionally to FIG. 2, GUI based interface 112 can be used to provide information regarding any individual(s) 86 included in a particular condition 76N. For example, a user can use GUI based interface 112 to provide a name or designator (e.g., father, daughter, president, client, employee number, etc.) and a video image associated with a particular individual 86. Alternatively, the user can provide a name or designator, and cognitive engine 174 can use the provided information to retrieve an image of individual 86 from a social media account, image archive, or any other location that an image of individual may be available. In any case, this video image may be updated and/or enhanced using video images 80 obtained by video capture device 84, from social media, or from any other available source. The information associated with individual 86 can then be provided by cognitive system 174 to control engine 172 using an image to input streaming controller 114.

In addition, GUI based interface 112 can also be used to provide information regarding any action 88 associated with individual(s) 86 in a particular condition 76N. In an embodiment, a user can utilize GUI based interface 112 to upload a video image of individual 86 performing the particular action 88. Alternatively, a name of the action 88 (e.g., exercising, cooking, putting on makeup, meeting with another particular individual, etc.) could be provided via GUI based interface 112 without a video image. Cognitive system 174 can search other sources for video image data and/or other information and use this to assemble characteristics that can be used to determine whether an action 88 is occurring. The information associated with action 88 can then be provided by cognitive system 174 to control engine 172 using an action to input streaming controller 116.

Referring again to FIG. 2 in conjunction with FIG. 3, condition satisfaction determining module 92 of system 72, as executed by computer system/server 12, is configured to use cognitive system 74 to determine whether video that is currently being captured by video capture device 84 satisfies set of conditions 76A-N. In an embodiment, the making of this determination could be triggered by an identification by an event monitor/notifier 118 of a change in the scene (e.g., individuals 86) and/or actions 88 in video image 80 being captured by video capture device. In any case, to accomplish this, a virtual cognitive interface 132 in containing device 182 can provide video image data 180 from image capture device 84 to control engine 172. This video image data 180 can be a raw video image 80 captured by video capture device 84. Alternatively, virtual cognitive interface 132 can process the video image 80 to generate video image data 180 that identifies individual 86, action 88, and/or other data, and this processed video image data 180 can be forwarded to control engine 172 in conjunction with (e.g., metadata) or in place of the raw video image data 180. In any case, control engine 172 can analyze this video image data 180 in light of the information provided by image to input streaming controller 114 and action to input streaming controller 116 to make its determination.

Capture device modification module 94 of system 72, as executed on computer system/server 12, is configured to modify the operation of video capture device 84 in response to a determination by condition satisfaction determining module 94 that the video currently being captured by video capture device 84 satisfies set of conditions 76A-N. In an embodiment, each of set of conditions 76A-N can be associated with a modification 78A-N. In an embodiment, control engine 172 can send an instruction to containing device 182 to perform to specific modification 78N associated with the detected condition via a physical cognitive interface 134. Then, containing device 182 can execute the instruction to modify the operation of video capture device 84. To this extent, the operation of video capture device 84 can undergo a number of different modifications 78A-N depending on the satisfied condition 76A-N. These modifications 78A-N can include stopping the capture of video images 80 by video capture device 84 until the set of conditions 76A-N is no longer satisfied, obscuring all or a portion of the video images 80, applying a heightened examination level to the video, or any other modification 78A-N that may be desired.

To this extent, system 72 is able to make decisions using cognitive system 174 that it would previously have been impossible to make and to perform actions based on these decisions. Similarly to the functionality of a self-driving car, this decision-making and action performing ability based on real-world situations would have previously required a human being to be present and alert on a full-time basis. Thus, the teachings of the present invention improve the environment of a household in which one or more video capture devices 84 are present by providing human-like decision-making and control of these video capture devices 84 without the need for actual human intervention.

For example, assume that the environment is a home environment that contains a young daughter. Condition 76N could specify the daughter as individual 86 and action 88 as being in a state of putting on makeup. If these conditions were satisfied, modification 78N could specify that the capture of video images 80 be stopped.

In another example, assume that the environment is a home environment in a culture in which children are expected not to cook because it could be dangerous. A condition 76A could be made that specifies the child as individual 86 and specifies action 88 as cooking. If these conditions were satisfied, modification 78N could specify that the capture of video images 80 be stopped.

Further, these and other scenarios could be modified to take into account instances in which people other than family members are in the home, as behavior may be different with others present.

In yet another example, assume that the environment is a home environment in which an elderly person lives with his/her daughter or son. A condition 76A could be made that specifies the elderly parent and other adults in the household as individuals 86 and specifies action 88 as everyone being asleep. If these conditions were satisfied, modification 78N could specify that the capture of video images 80 be increased to monitor the elderly parent's health and, optionally, provide an alert if the elderly parent fails to move for a prolonged period of time.

In still yet another example, assume that the environment is an office environment. A condition 76A-N could be made that specifies the inhabitant of the office and the president of the company as individuals 86 and specifies action 88 as the door to the office being closed. If these conditions were satisfied, modification 78N could specify that the capture of video images 80 be stopped so as to protect the privacy of discussions within the office.

Optionally, an operation resumption module (not shown) can resume the original capture of the video images 80 by video capture device 84. To accomplish this, a determination can be made as to whether the set of conditions 76A-N are no longer satisfied. For example, an expected period of time necessary to complete action 88 can be determined. This determination can be made based on an amount of time individual 86 normally takes to perform action 88 and/or an amount of time a typical person normally takes to perform action 88. After the amount of time has expired, the operation resumption module can use an event monitor/notifier 118 (FIG. 3) perform a monitoring activity. This monitoring activity could include capturing a monitoring video image (e.g., short duration video image 80 made with the express purpose of determining whether set of conditions 76A-N is still satisfied). If set of conditions 76A-N is still satisfied, the modified capture can be continued for another period of time and the monitoring video image can be deleted.

Alternatively, the monitoring activity could include receiving an indication from the individual as to whether action 88 has been completed. If individual 86 or another user indicates that the set of conditions 76A-N is still satisfied, the modified capture can be continued for another period of time and another prompt can be sent. Still further, in environments in which there is an audio capture device 85 proximate to video capture device 84 (e.g., within containing device 82), the determining of whether the set of conditions is no longer satisfied can include captured audio associated within the environment while the modification 78A-N is occurring and resuming the unmodified capture by the video capture device 84 if an analysis of the audio indicates that the conditions 76A-N are no longer satisfied.

Figure 4:
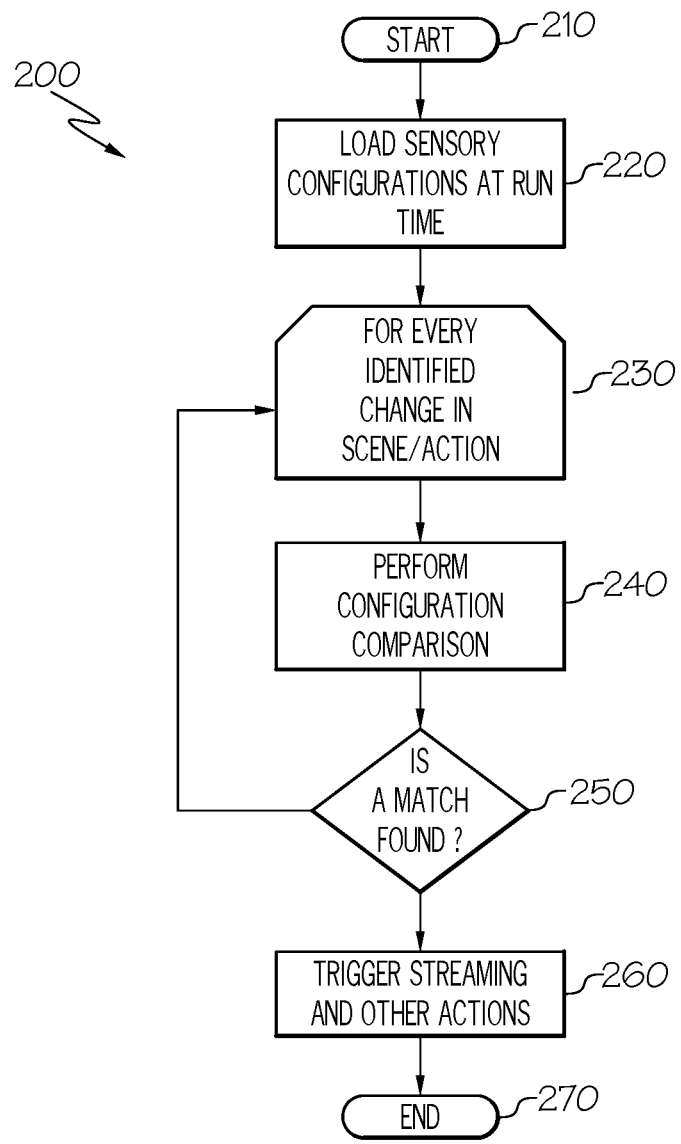
FIG. 4 depicts an example process flowchart according to an embodiment of the present invention.

Referring now to FIG. 4, a process flowchart 200 according to an embodiment of the present invention is shown. Flow begins at 210. At 220, sensory configurations are loaded (e.g., at run time). At 230, a determination is made as to whether a change in scene/action has occurred. If so, at 240, a configuration comparison is performed. At 250, a determination is made as to whether the configuration comparison has produced a match. If not, flow returns to 230. If so, a modification action (e.g., trigger screening or other actions) is performed at 260 and flow ends at 270.

Figure 5:
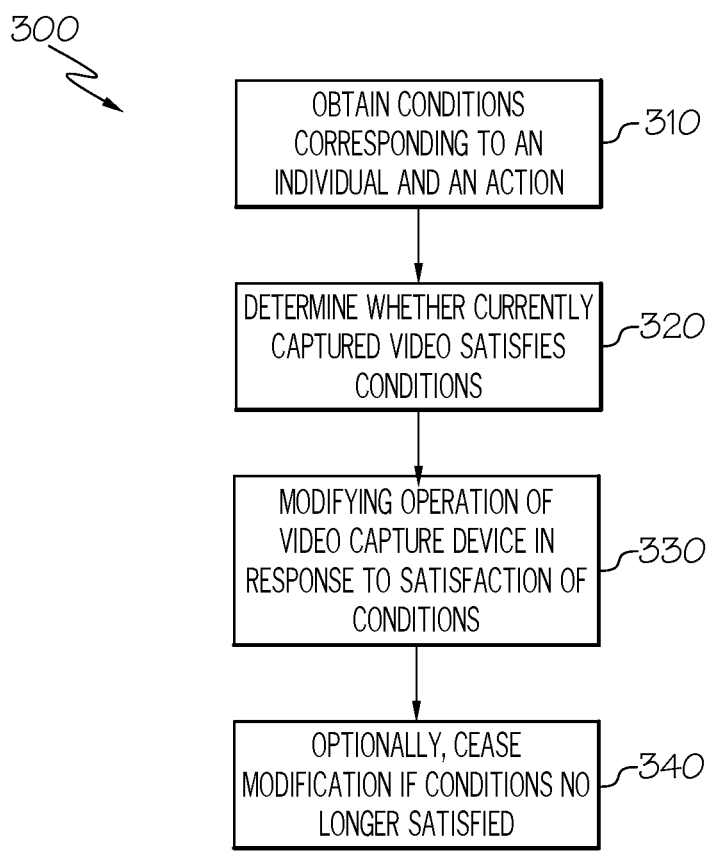
FIG. 5 depicts an example process flowchart according to an embodiment of the present invention.

Referring now to FIG. 5 in conjunction with FIG. 2, a process flowchart 300 according to an embodiment of the present invention is shown. At 310, condition obtaining module 90 of system 72, as executed by computer system/server 12, uses cognitive system 74 to obtain a set of conditions 76A-N corresponding to an individual 86 and an action 88 performed by the individual 86. At 320, condition satisfaction determining module 92, as executed by computer system/server 12, uses cognitive system 74 to determine whether video currently being captured by video capture device 84 satisfied set of conditions 76A-N. At 330, capture device modification module 94, as executed by computer system/server 12, modifies an operation of video capture device 84 in response to a determination that the video currently being captured by video capture device 84 satisfies set of conditions 76A-N. Finally, optionally, at 340, operation resumption module, as executed by computer system/server 12, ceases the modifying of the operation of video capture device 84 is set of conditions 76A-N is no longer satisfied.

The process flowchart of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for controlling an operation of a video capture device, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for controlling an operation of a video capture device. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for controlling an operation of a video capture device. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for controlling an operation of a video capture device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for controlling an operation of a video capture device, comprising:
   obtaining, using a cognitive computer system, a set of conditions, each of the set of conditions corresponding to an individual and an action performed by the individual;
   determining, using the cognitive computer system, whether video currently being captured by the video capture device satisfies the set of conditions; and
   modifying an operation of the video capture device in response to a determination that the video currently being captured by the video capture device satisfies the set of conditions, wherein the modifying of the operation of the video capture device includes stopping a capture of the video until the set of conditions is no longer satisfied;
   determining whether the set of conditions is no longer satisfied, wherein the determining of whether the set of conditions is no longer satisfied includes:
   determining an expected period of time necessary to complete the action;
   performing a monitoring activity after an expiration of the expected period of time; and
   continuing the stopping of the capture of the video in response to a determination that the set of conditions is still satisfied,
   wherein the monitoring activity is selected from a group consisting of: capturing a monitoring video image and receiving an indication from the individual as to whether
   the action has been completed; and
   resuming the capture of the video in response to a determination that the set of conditions is no longer satisfied.

2. The method of claim 1, wherein the determining of whether the set of conditions is no longer satisfied includes capturing audio associated with the video.

3. The method of claim 1, wherein the modifying of the operation of the video capture device includes applying a heightened examination level to the video.

4. The method of claim 1, wherein the video capture device is part of a cognitive robotic (CR) device.

* * * * *